(12) United States Patent
Behrens

(10) Patent No.: US 6,351,911 B1
(45) Date of Patent: *Mar. 5, 2002

(54) VEGETATION SUPPORT CONSISTING OF A MAT OF ENTANGLED ORGANIC FIBERS

(76) Inventor: Wolfgang Behrens, Trespenmoor 1, D-27243 Gross Ippener (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/424,739

(22) PCT Filed: Jun. 3, 1998

(86) PCT No.: PCT/DE98/01548

§ 371 Date: Nov. 30, 1999

§ 102(e) Date: Nov. 30, 1999

(87) PCT Pub. No.: WO98/57534

PCT Pub. Date: Dec. 23, 1998

(30) Foreign Application Priority Data

Jun. 17, 1997 (DE) .......................................... 197 25 403

(51) Int. Cl.[7] .................................................. A01C 1/04
(52) U.S. Cl. .......................................................... 47/56
(58) Field of Search ............................ 47/65.9, 56, 9, 47/58.1

(56) References Cited

U.S. PATENT DOCUMENTS

| | | | | |
|---|---|---|---|---|
| 3,516,196 A | 6/1970 | Lippoldt et al. | | |
| 4,357,780 A | * 11/1982 | Ball | ............................ | 47/56 |
| 4,414,776 A | 11/1983 | Ball | | |
| 5,983,561 A | * 11/1999 | Behrens | ............................ | 47/56 |
| 6,158,168 A | * 12/2000 | Behrens | ............................ | 47/9 |

FOREIGN PATENT DOCUMENTS

| | | |
|---|---|---|
| AU | 81394 75 | 11/1976 |
| DE | 82 31 033 | 3/1983 |
| DE | 36 31 716 | 3/1988 |
| DE | 40 22 413 | 1/1992 |
| DE | 41 35 714 | 6/1992 |
| DE | 43 29 957 | 3/1994 |
| EP | 0 620 965 | 10/1994 |
| EP | 0 706 753 | 9/1995 |

* cited by examiner

Primary Examiner—Charles T. Jordan
Assistant Examiner—Francis T. Palo
(74) Attorney, Agent, or Firm—Collard & Roe, P.C.

(57) ABSTRACT

The invention relates to a vegetation support (10) consisting of a mat of entangled organic fibers (14) which form said vegetation support (10). A substrate (20) is introduced into the hollow spaces of the mat (12) and a plant material (22) able to germinate, especially seeds, spores, sprouts or the like, is planted on an upper side (16) of the mat (12). The fibers (14) of the mat (12) are secured against detachment from the mat (12). The inventive vegetation support (10) is characterized in that the mat (12) fibers (14) are coconut fibers and that a plant-compatible binding agent (28) is used to prevent the fibers (14) from becoming detached from the mat (12). The binding agent is applied to the surfaces of at least a part of the fibers (14) and ensures that the fibers (14) of the mat (12) are at least partly glued to each other.

15 Claims, 3 Drawing Sheets

VEGETATION SUPPORT CONSISTING OF A MAT OF ENTANGLED ORGANIC FIBERS

FIELD OF THE INVENTION

Figure 1:
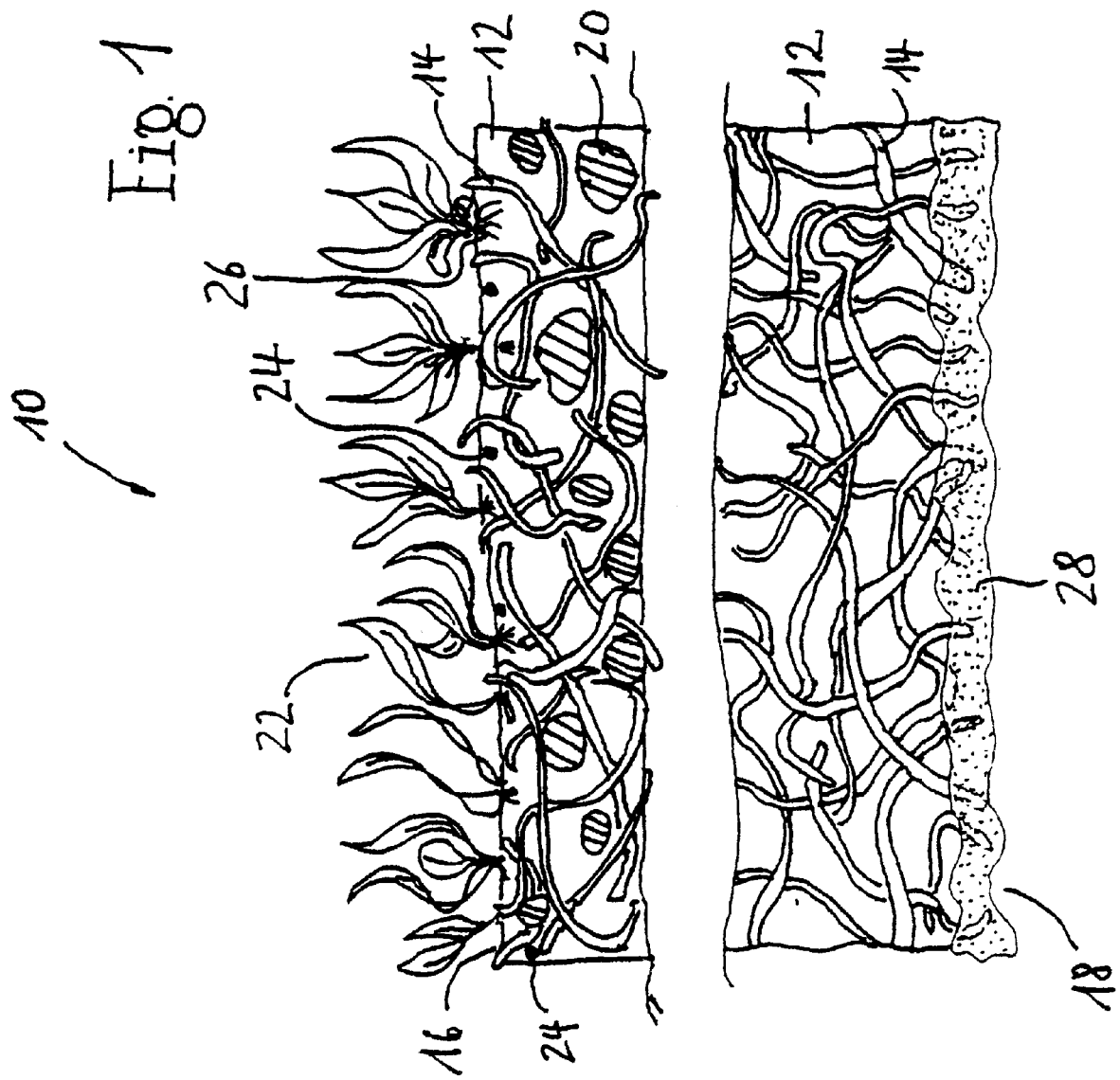

The present invention relates to a vegetation support comprising a mat made of interleaved organic fibres.

PRIOR ART

Such pre-grassed vegetation supports, as known from DE 36 31 716 C2, serve as grass lining for rooves, inclined surfaces, in particular slopes and other surfaces which are to be covered by a layer of vegetation. These vegetation supports known hitherto comprise a middle layer of interleaved fibres and an upper lower layer of an inorganic formed fabric, which are connected to one another by means of stepping or perforation and to the middle layer. The formed fabrics of the upper and the lower layer accordingly serve to reinforce the vegetation support, that is, they absorb the tensile forces from laying on inclined surfaces. The formed fabrics also serve to prevent loosening of the relatively loose only fibres located in the middle support layer.

Such vegetation supports have proven themselves widely and in particular it is an advantage with such vegetation supports that prior to laying, substrate is applied to the vegetation support and germination-capable plant material is applied to the vegetation support or introduced into the vegetation support, and the germination-capable plant material is already grown into the support layer. The losses in plant material after application of the already grassed vegetation support in this way to the surface to be built up are accordingly kept low.

The disadvantage of these vegetation supports known to date is that the stepping between the upper and lower formed fabric layers is relatively expensive and that the formed fabric layers additionally consist of a material which cannot rot and which can be recycled. With the natural landscaping of surfaces it is important, however, that the material of the vegetation support comprises a fully recyclable material, whereby special attention is paid to the fact that raw materials which as far as possible grow again are put to use for the material of the vegetation support.

Another disadvantage is that the middle support layer of this known vegetation support rots relatively quickly. It is true that rotting of the support layer is basically desirable, yet the rotting procedures with the known vegetation supports proceed too quickly, with the result that they become unusable after a relatively short time. This is particularly disadvantageous if, for logistical reasons, the vegetation support has to be stored prior to actual lining work for a relatively long period, the result of which can be that the vegetation support can no longer be picked up and rolled up for transporting, because of the advanced rotting process.

It has also been demonstrated that the support layer tends to shrink during prolonged dryness. This results in shrinkage by about 10 cm in width for a vegetation support width of 1 m, for example. When strips are laid side by side this leads to unacceptable gaps.

The object of the present invention is to produce a vegetation support of the type initially described, which can be manufactured easily and cost-effectively, which consists of a recyclable material insensitive to dry-shrinking with sufficient firmness and which decays as slowly as possible and in a controlled manner.

This task is solved by a vegetation support of the type described at the outset, which exhibits the characteristics of the distinguishing part of Claim 1. The vegetation support according to the present invention is characterised in that the fibres of the mat are coconut fibres and in that the security against loosening of the fibres from the mat is a plant-compatible binder material which is applied to the upper surfaces of at least one part of the fibres and by means of which the fibres of the mat are stuck to one another at least partially.

Through this process a vegetation support is produced in a surprisingly easy manner, whose mat forming the actual vegetation support is not secured by overlaid and underlaid formed fabrics, rather whose fibres of the mat are connected to one another by means of a plant-compatible binder. By means of this binder, which is, by way of advantage, a synthetic dispersion, latex, a bitumen emulsion, an adhesive, a resin or a wax, on the one hand the fibres of the mat are held together, and on the other hand the binder, in particular if it is applied to the underside of the mat, in accordance with an advantageous embodiment of the present invention, can absorb tensile forces originating from laying the vegetation support on inclined slopes.

The binder also guarantees, in particular when the majority of the fibres is cross-linked on its upper surfaces with the binder, that the rotting process of the mat proceeds relatively slowly. It could be advised that the normal rotting period lasted from around 3 to 12 years to around 12 to 18 years. In addition, it is due to the binder that the fibres, namely the coconut fibres, become insensitive to shrinkage brought about by dryness.

It is particularly preferred if the solvent is latex, which retards the advance of the rotting process of the fibres on the one hand, but on the other hand is fully decomposable With respect to the drainage mat made of wood wool disclosed in DE 43 29 957 A1 it is known to cross-link the latter with latex and to stick down the wood-wool fibres. But such a mat is not suitable as vegetation support, since the cavities between the relatively broad wood-wool fibres are too wide to securely hold substrate and roots. In addition, wood wool rots very quickly. The same applies to a support layer made of wood wool for ready-made lawn known from DE 82 31 033 U2.

As already indicated, the binder can be applied to the upper surface of all fibres, that is, the binder is in this case distributed over the entire cross-section of the mat, or the binder can be applied to one side of the mat. In the latter case, only those fibres projecting on the underside of the mat are cross-linked with the binder. It has been demonstrated that it is sufficient to provide one side only, that is, the underside of the mat with the binder. This means then that not all fibres of the fibre bundle of the mat are cross-linked with the binder, which can in theory result in the fact that the fibres of the upper side of the mat could be loosened from the fibre bundle of the mat; however, it has been shown in practice that this danger is to be ignored. If the binder is applied very thickly to the underside, this effectively results in a relatively thick layer of the binder as a 'sole' which can advantageously absorb any resulting tensile forces.

If it is a question of very high tensile forces, that is, in the case of strongly inclined surfaces, the underside of the mat can be provided with a formed fabric or a lattice fabric as additional security, which can then absorb the resulting tensile forces. With this arrangement, the binder can be advantageously used to stick the mat to the formed fabric or to the lattice fabrics In this case, any time-intensive and cost-intensive stepping or perforation can be dispensed with.

In a practical embodiment of the invention it is provided for inorganic fibres to be intermingled with the coconut fibres, on a mineral basis and/or made of synthetic, whenever desired for special application cases. By way of example, mineral wool fibres can be intermixed with the coconut fibres to increase fire safety of the vegetation support.

In a further embodiment of the present invention it is provided that the underside of the mat is attached to a sheet made of decayable synthetic. This type of relatively quickly rotting sheet can serve several purposes.

The sheet can, for instance, retain moisture in the vegetation support for a certain period. However, the sheet can also be used for preventing sowing material and unwanted plant parts from piercing through the bottom into the vegetation support, in particular when the vegetation support is laid on earth-bound surfaces, for example on street slopes. Using a normal, non-decaying sheet made of polyolefin would also be conceivable; such sheets would accumulate, however, as unwanted refuse on expiry of the normal serviceable life of the vegetation support, whereas decomposable sheets, constructed from starch products for instance, decay along with the mat of the vegetation support and are no threat to the environment.

BRIEF DESCRIPTION OF THE PREFERRED EMBODIMENT

Figure 2:
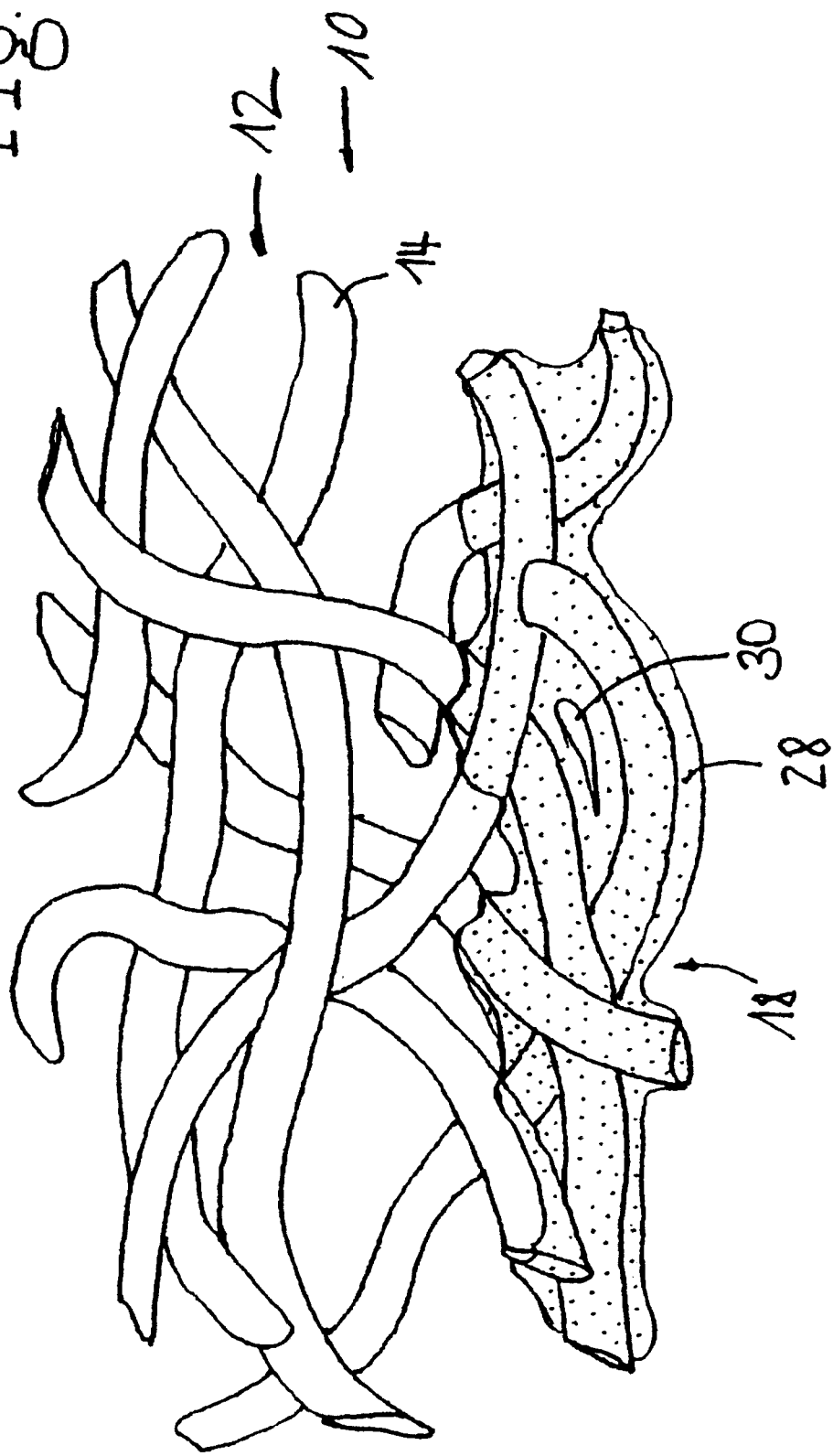
Figure 3:
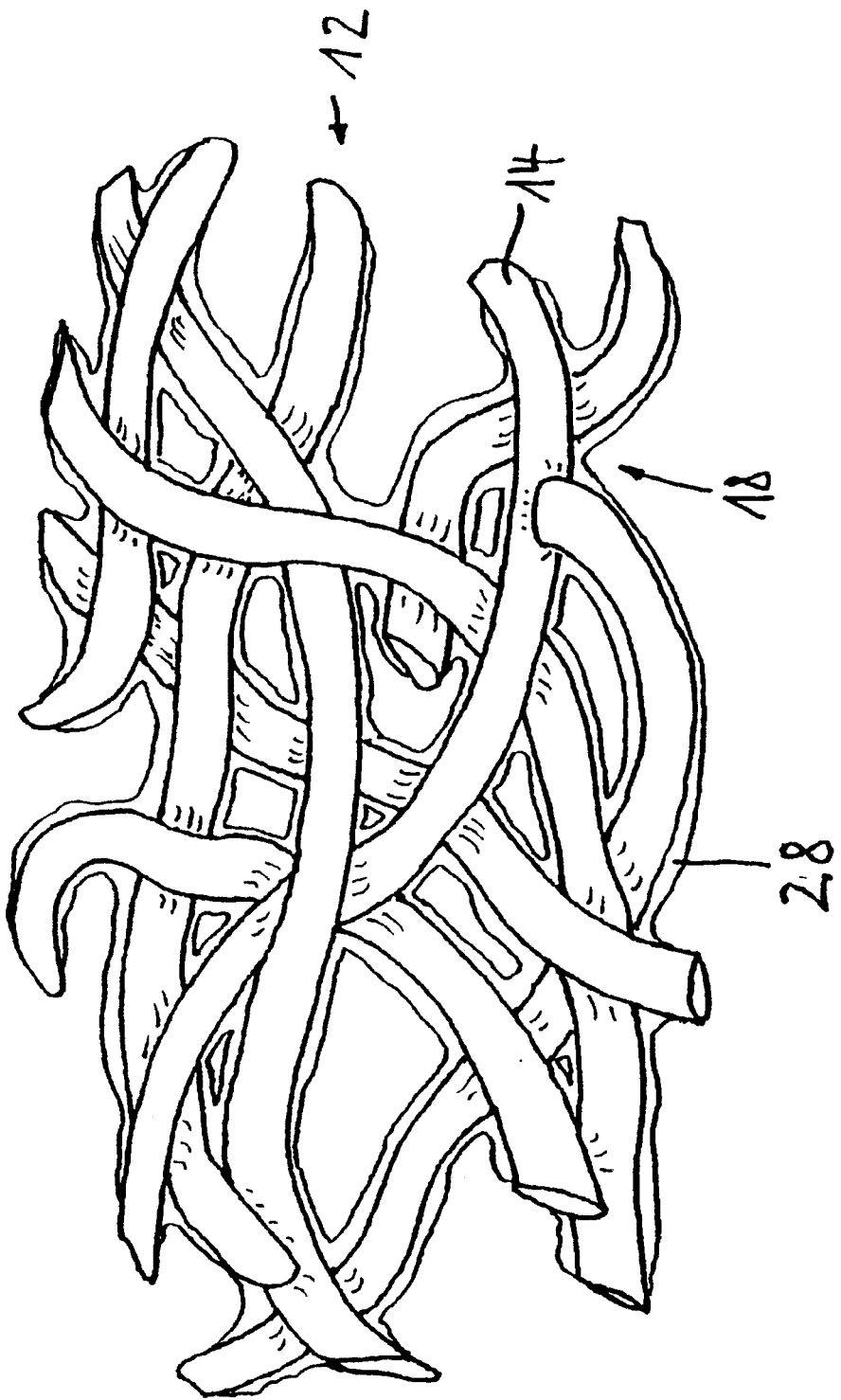

Further advantages and embodiments of the present invention will be explained with the assistance of the diagrams, the patent claims and the following specification. In the diagrams:

FIG. 1 shows a cross-section through a segment of a vegetation support according to the present invention, FIG. 2 shows a partial side view of an embodiment of the vegetation support according to the present invention on an enlarged scale, and FIG. 3 shows a view similar to that of FIG. 2 of another embodiment of the vegetation support according to the present invention.

DETAILED DESCRIPTION OF THE PREFERRED EMBODIMENT

FIG. 1 illustrates a side view of a segment of a first embodiment of vegetation support 10 according to the present invention. This essentially comprises a mat 12 made of interleaved disordered organic fibres 14 which in the embodiments illustrated here are coconut fibres. Mat 12 comprises an upper side 16 and an underside 18. Substrate particles 20, serving as a nutrient basis for plants 22, and plants 22 themselves are fed into mat 12. Plants 22 which can be grown from seeds 24 sown onto mat 12 or spores, sprouts or other plant parts capable of germinating are anchored in the fibre bundle of mat 12 by their roots 26.

According to FIG. 1, underside 18 of mat 12 is provided over its entire surface with a binder 28 By way of binder 28 fibres 14 are laid in the surface of underside 18 and are thereby secured against loosening from the fibre bundle of mat 12.

FIG. 2 illustrates a segment of underside 18 of mat 12 of vegetation support 10 on an enlarged scale, compared to FIG. 1. The bottommost fibres 14 of mat 12 are stuck to one another by means of binder 28 illustrated interlaced. In the embodiment according to FIG. 2 the layer thickness of binder 28 is designed somewhat thinner than in the embodiment. according to FIG. 1, such that cavities 30 form which on the one hand enable good ventilation of underside 18, but on the other hand enable rooting of roots 26 through underside 18 of mat 12.

Accordingly, while only one embodiment of the present invention have been shown and described, it is obvious that many changes and modifications may be made thereunto without departing from the spirit and scope of the invention.

A further embodiment is illustrated in detail in FIG. 3, wherein fibres 14 of mat 12 are provided on their entire surface, that is, over the entire cross-section of the mat, with binder 28, by means of which fibres 14 adjoining one another or lying on one another are stuck together by binder 28.

The binder illustrated in the embodiments is latex, although another appropriate binder can be selected.

What is claimed is:

1. A vegetation support comprising a mat made of interleaved organic fibres which form the vegetation support, whereby substrate is introduced into the cavities of the mat, and whereby an upper side of the mat is grassed by application of germination-capable plant material, in particular seeds, spores and the like, and whereby the fibres of the mat are secured against loosening from the mat, characterised in that the fibres (14) of the mat (12) are coconut fibres and in that the security against loosening of the fibres (14) from the mat (12) is a plant-compatible binder (28) which is applied to the upper surfaces of at least one part of the fibres (14) and by means of which the fibres (14) of the mat (12) are stuck to one another at least partially.

2. A vegetation support as claimed in claim 1, characterised in that the binder (28) is applied superficially to the underside (18) of the mat (12).

3. A vegetation support as claimed in claim 2, characterised in that the binder (28) is applied to the underside (18) of the mat (12) at a thickness of 0.01 mm to 3 mm.

4. A vegetation support as claimed in claims 1, characterised in that the binder (28) is a synthetic dispersion.

5. A vegetation support as claimed in claim 1, characterised in that the binder (28) is latex.

6. A vegetation support as claimed in claim 1, characterised in that the binder (28) is a bitumen emulsion.

7. A vegetation support as claimed in claim 1, characterised in that the binder (28) is an adhesive.

8. A vegetation support as claimed in claim 1, characterised in that the binder (28) is a resin.

9. A vegetation support as claimed in claim 1, characterised in that the binder (28) is a wax.

10. A vegetation support as claimed in claim 1, characterised in that inorganic fibres are mixed in with the organic fibres (14) of the mat (12).

11. A vegetation support as claimed in claim 1, characterised in that the mat (12) comprises a thickness of 0.5 to 10 cm.

12. A vegetation support as in claim 1, characterised in that the mat (12) comprises a width of 0.2 to 4 m.

13. A vegetation support as claimed in claim 1, characterised in that the underside (18) of the mat (12) is provided with a formed fabric which is attached to the mat (12) by means of the binder (28).

14. A vegetation support as claimed in claim 1, characterised in that the underside (18) of the mat (12) is provided with a lattice fabric which is attached to the mat (12) by means of the binder (28).

15. A vegetation support as claimed in claim 1, characterised in that the underside (18) of the mat (12) is attached to a sheet made of a decayable synthetic.

* * * * *